US009739170B2

(12) United States Patent
Ertas (10) Patent No.: US 9,739,170 B2
(45) Date of Patent: Aug. 22, 2017

(54) FLEXIBLY DAMPED MOUNTING ASSEMBLIES FOR POWER GEAR BOX TRANSMISSIONS IN GEARED AIRCRAFT ENGINE ARCHITECTURES

(71) Applicant: General Electric Company

(72) Inventor: Bugra HAn Ertas, Niskayuna, NY (US)

(73) Assignee: GENERAL ELECTRIC COMPANY, Niskayuna, NY (US)

( * ) Notice: Subject to any disclaimer, the term of this patent is extended or adjusted under 35 U.S.C. 154(b) by 441 days.

(21) Appl. No.: 14/585,665

(22) Filed: Dec. 30, 2014

(65) Prior Publication Data

US 2016/0186604 A1 Jun. 30, 2016

(51) Int. Cl.
*F01D 25/04* (2006.01)
*F02K 3/06* (2006.01)
*F02C 7/36* (2006.01)
*F16H 57/025* (2012.01)
*F02C 3/107* (2006.01)

(52) U.S. Cl.
CPC .............. *F01D 25/04* (2013.01); *F02C 3/107* (2013.01); *F02C 7/36* (2013.01); *F02K 3/06* (2013.01); *F16H 57/025* (2013.01); *F05D 2260/30* (2013.01); *F05D 2260/40311* (2013.01); *F05D 2260/96* (2013.01)

(58) Field of Classification Search
CPC .. F01D 25/04; F02C 3/107; F02C 7/36; F02K 3/06; F16H 57/025; F05D 2260/30; F05D 2260/40311; F05D 2260/96
See application file for complete search history.

(56) References Cited

U.S. PATENT DOCUMENTS

| | | |
|---|---|---|
| 5,603,574 A | 2/1997 | Ide et al. |
| 8,529,197 B1 | 9/2013 | Coffin et al. |
| 8,894,538 B2 * | 11/2014 | McCune ................. F01D 5/027 475/331 |

* cited by examiner

Primary Examiner — Richard Edgar
(74) Attorney, Agent, or Firm — John P. Darling (57) ABSTRACT

An assembly for flexibly damping a power gear box for a gas turbine engine, the assembly includes a flexible mount connected to the power gear box at a first end of the flexible mount; a member connected to the flexible mount at the first end of the flexible mount and a second end of the flexible mount, wherein the first end of the flexible mount includes an outer rim connected to the member and an inner rim connected to the power gear box and a set of circumferentially segmented squeeze film damper lands configured to receive a damping fluid is provided between the inner rim and the outer rim.

19 Claims, 8 Drawing Sheets

FLEXIBLY DAMPED MOUNTING ASSEMBLIES FOR POWER GEAR BOX TRANSMISSIONS IN GEARED AIRCRAFT ENGINE ARCHITECTURES

BACKGROUND

The present technology generally relates to flexibly damped mounting assemblies for planetary gear boxes in geared aircraft engine architectures.

Rotating equipment such as aircraft engines are subjected to rotating loads due to rotor imbalance. These vibrations generated by the rotating assembly produce dynamic bearing loads that are transmitted to the engine frame. In efforts to isolate the engine structure from rotating forces, main shaft bearings have historically been "soft-mounted" on flexible supports in combination with squeeze film dampers (SFDs). This type of bearing support reduces vibration transmissibility to the engine structure and also reduces overall dynamic bearing loads. For aircraft engine main shaft bearings, the SFD is a full circular damper which operates on the principle of energy dissipation in the squeeze film land, and may incorporate end seals. These dampers, used since the 1970's, are in virtually every aircraft engine.

Future aircraft engine architectures are leveraging the use of a planetary gearbox between the fan and low pressure turbine (LPT) in efforts to operate the LPT at higher speeds while operating the fan at lower speeds. This configuration enables higher bypass ratios which then leads to lowered specific fuel consumption. However, with the addition of a planetary gear box additional rotating imbalance loads and dynamic gear loads will be generated.

BRIEF DESCRIPTION

In accordance with one example of the technology disclosed herein, an assembly for flexibly damping a power gear box for a gas turbine engine comprises a flexible mount connected to the power gear box at a first end of the flexible mount; and a member connected to the flexible mount at the first end of the flexible mount and a second end of the flexible mount, wherein the first end of the flexible mount includes an outer rim connected to the member and an inner rim connected to the power gear box and a circumferentially segmented squeeze film damper land configured to receive a damping fluid is provided between the inner rim and the outer rim.

In accordance with another example of the technology disclosed herein, a gas turbine engine comprises a fan; a turbine connected to the fan through a power gear box; and an assembly for flexibly damping a power gear box, wherein the assembly flexibly damps vibrations of a turbine shaft connected to the power gear box and a fan shaft connected to the power gear box.

DRAWINGS

These and other features, aspects, and advantages of the present technology will become better understood when the following detailed description is read with reference to the accompanying drawings in which like characters represent like parts throughout the drawings, wherein.

DETAILED DESCRIPTION

Figure 1:
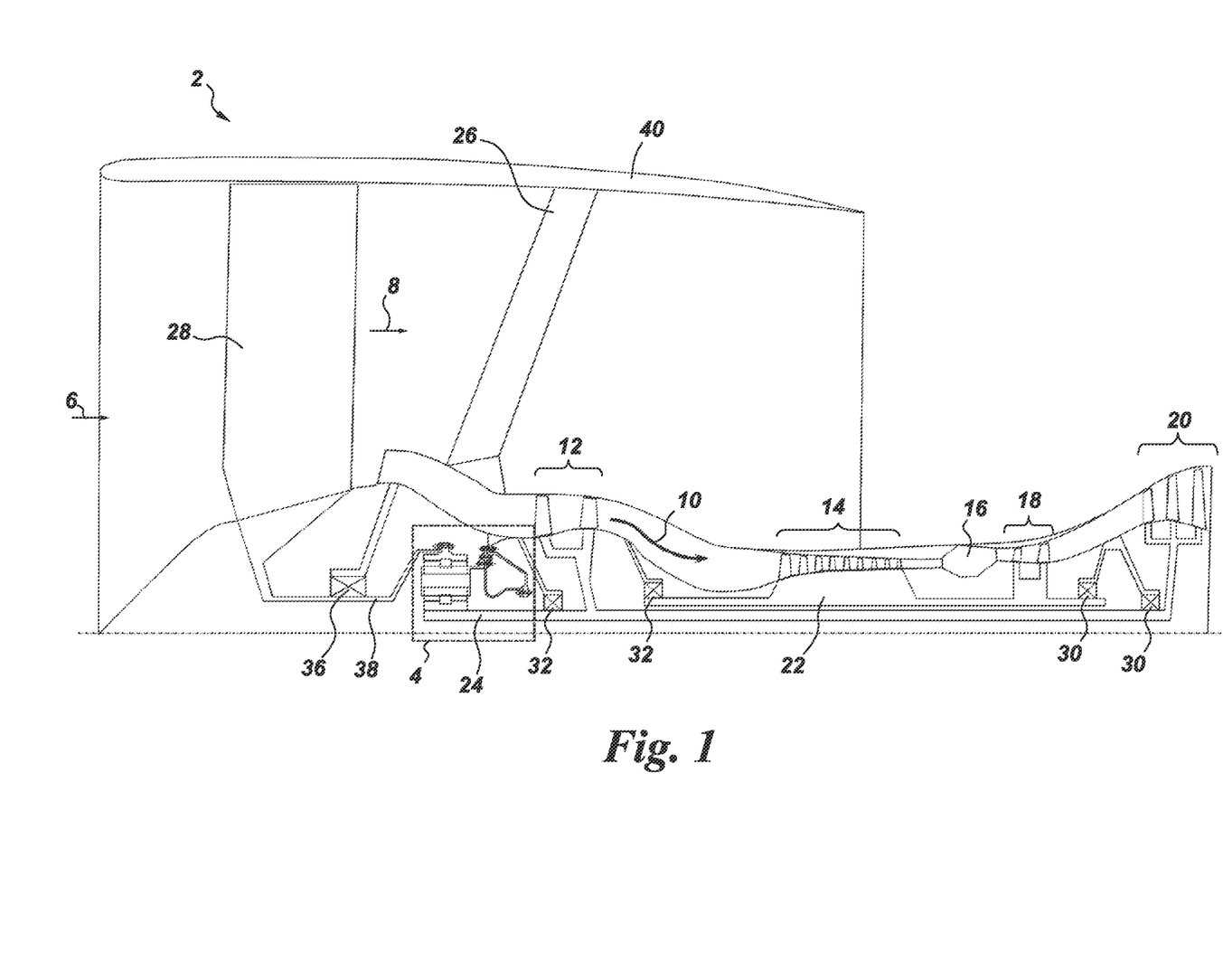
FIG. 1 schematically depicts a gas turbine engine for an aircraft including a flexibly damped power gear box (PGB) module according to an example of the present technology.

Referring to FIG. 1, a gas turbine engine 2 includes a fan 28, a low pressure or booster compressor 12, a high pressure compressor 14, a combustor 16, a high pressure turbine 18, and a low pressure turbine 20. The fan 28 draws intake air 6 into a bypass flow 8 and compressor section (the booster 12 and the high pressure compressor 14) draw intake air 6 into a core flow 10 and compress the intake air 6 of the core flow 10 for introduction into the combustor 16. The compressed air is mixed with fuel and combusted in the combustor 16 and expands in the turbine section (the high pressure turbine 18 and the low pressure turbine 20).

Figure 2:
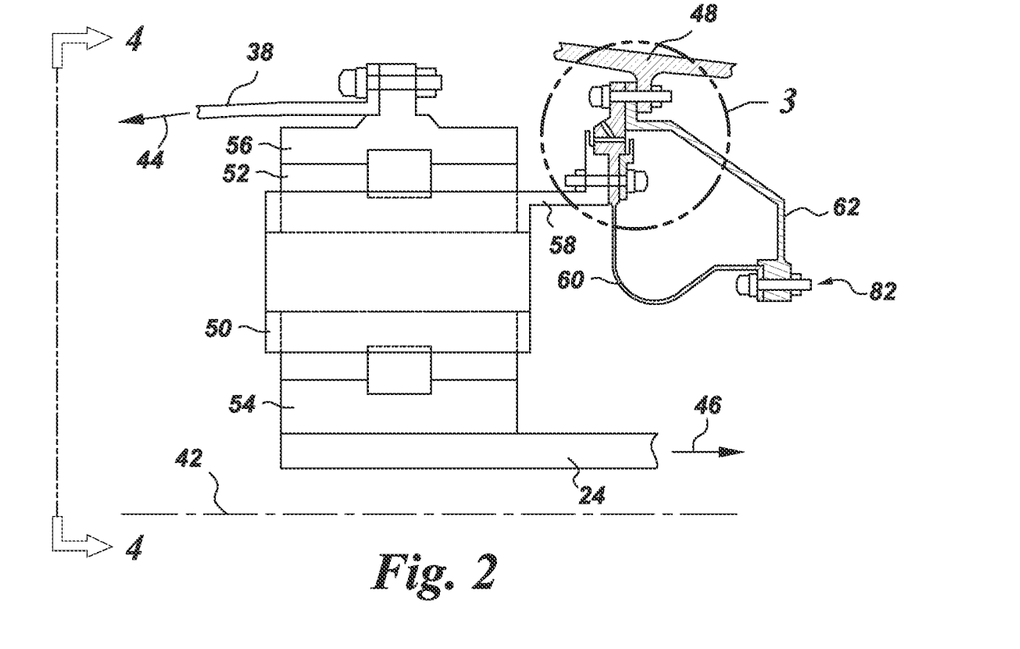
FIG. 2 schematically depicts the flexibly damped PGB module of FIG. 1.
Figure 3:
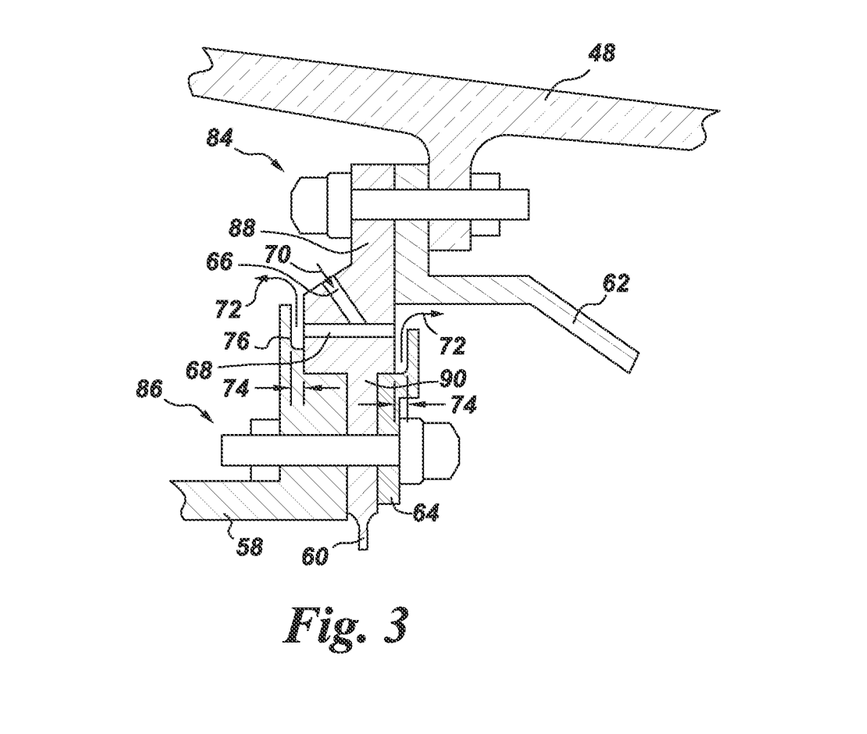
FIG. 3 schematically depicts a more detailed view of the lateral PGB damper of FIG. 2.

The gas turbine engine 2 includes a low pressure turbine shaft 24 and a core shaft 22 that are mounted in bearings 30, 32, 34 for rotation about an engine centerline 42 relative to an engine frame 48 (FIGS. 2 and 3). The engine frame 48 is connected to an engine frame strut 26 that is connected to a nacelle 40. The low pressure turbine shaft 24 connects the booster 12 and the low pressure turbine 20. The low pressure turbine shaft 24 is mechanically coupled to the fan 28 through a flexibly mounted power gear box (PGB) assembly 4 and a fan shaft 38 supported by bearings 36 to rotate the fan 28 at lower speeds than the LPT shaft 24. The core shaft 22 connects the high pressure compressor 14 and the high pressure turbine 18.

The core shaft 22 and the low pressure turbine shaft 24 are arranged concentrically and rotate via the bearings 30, 32, 34 about the engine centerline 42. The core flow 10 is compressed by the booster 12 and then the high pressure compressor 14, mixed with fuel and combusted in the combustor 16, then expanded over the high pressure turbine 18 and the low pressure turbine 20 which respectively rotate the core shaft 22 and the low pressure turbine shaft 24. The low pressure turbine shaft 24 rotates the fan 28 through the flexible mounted PGB 4. Thrust is provided to the aircraft by the bypass flow 8 due to the high bypass ratio. The gas turbine engine 2 of FIG. 1 may be referred to as a high-bypass geared turbofan engine.

Figure 4:
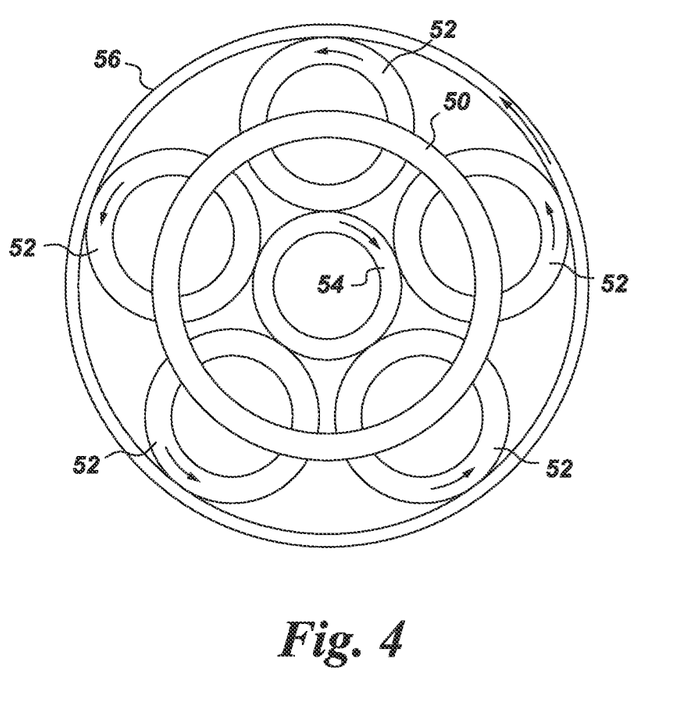
FIG. 4 schematically depicts a cross section of the planetary PGB module of FIG. 1 along line 4-4.

Referring to FIGS. 2-4, the PGB flexible mounting assembly 4 may include a PGB carrier 50 that carries or houses a plurality of planet gears 52. A ring gear 56 is connected to the fan shaft 38 as shown by arrow 44. The plurality of planet gears 52 rotate within the ring gear 56 and are driven by a sun gear 54 that is connected to the low pressure turbine shaft 24 as shown by arrow 46. The rotation of the low pressure turbine shaft 24 is transmitted through the planet gears 52 to the ring gear 56 which rotates the fan shaft 38 and thus the fan 28.

The PGB carrier 50 includes a carrier arm 58 that is connected to a first end of a flexible PGB mount 60 as shown by arrow 86. The first end of the flexible mount 60 includes an integral damper as shown in more detail in FIG. 3. The flexible PGB mount 60 is connected at a second end to a torque cone 62 as shown by arrow 82. The torque cone 62 and the first end of the flexible PGB mount 60 are connected to each other and the engine frame 48 as shown by the arrow 84. As shown in the drawings, the torque cone 62 includes a generally frusto-conical section between a first end at the connection 82 and a second end at the connection of the torque cone 62 and the flexible mount 60 to the engine frame 48. The design of the torque cone and flex mount are only one embodiment of the supporting structure for the PGB carrier. The mounting system can certainly be conceived to be a different design and form based on application requirements.

Figure 6:
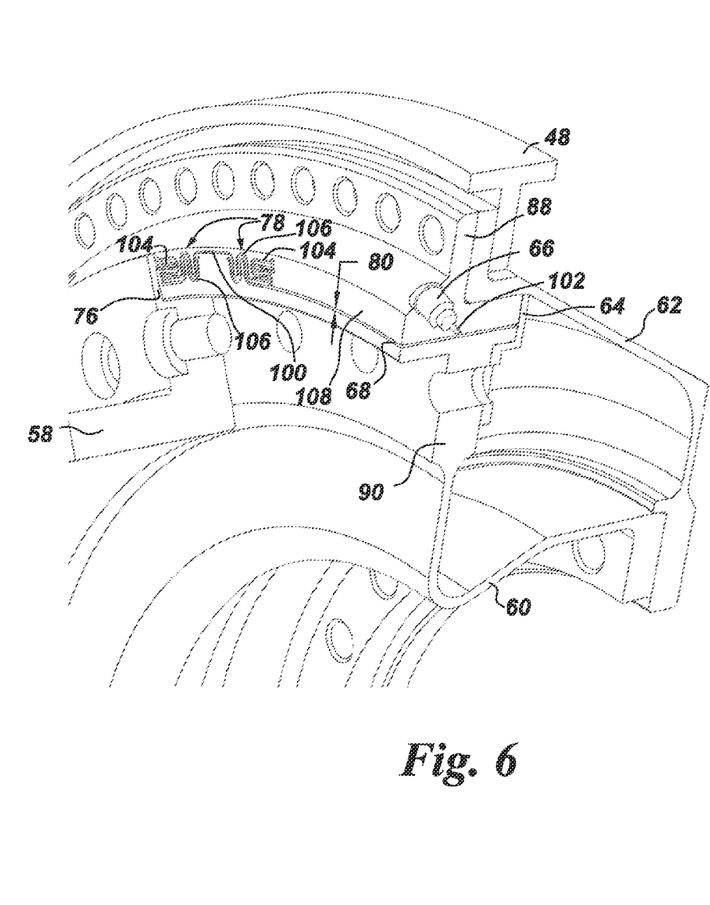
FIG. 6 schematically depicts a portion of the PGB carrier damper of FIG. 5 in more detail.

Referring to FIG. 3, the first end of the flexible PGB mount 60 includes an oil feed passage 66 for feeding oil into a damper land 68 formed through the first end of the flexible PGB mount 60. Oil 70 is provided to the damper land 68 through the passage 66. The damper land 68 provides a control volume for the damper and has a squeeze film damper (SFD) clearance 80 (FIG. 6). The carrier arm 58 includes an end seal 76 and an end seal 64 is connected to the flexible PGB mount 60 and the carrier arm 58 by the connection 86. The end seals 64, 76 provide end seal clearances 74 through which oil 72 may expelled as the damper dissipates vibratory energy.

Figure 5:
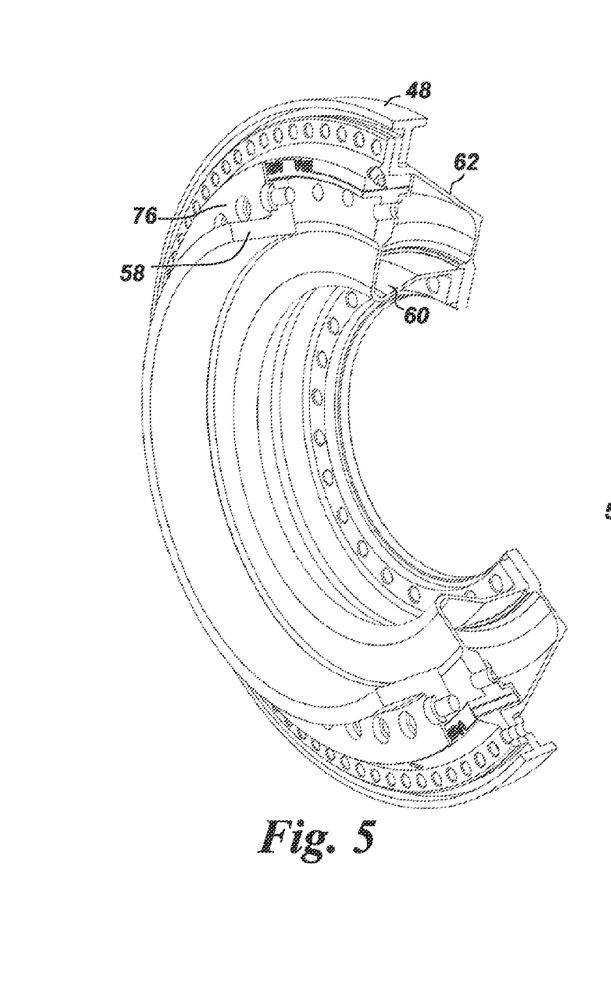
FIG. 5 schematically depicts an integral PGB carrier damper according to an example of the present technology.

The integral damper of the flexible PGB mount 60 includes an outer rim 88 that is stationary due to its connection 84 to the engine frame 48 and an inner rim 90 that may oscillate or vibrate at the connection 86 to the carrier arm 58 and the end seal 64. Referring to FIGS. 5 and 6, the integral damper formed by the outer rim 88 and the inner rim 90 of the flexible PGB mount 60 includes springs 78 integrally formed in the flexible PGB mount 60. Each spring 78 includes a radial flex element 104 and a torsional flex element 106. The springs 78 may be integrally formed in the flexible PGB mount 60 by, for example, electric-discharge machining (EDM). The springs 78 may be provided circumferentially around the flexible PGB mount 60. A squeeze film damper (SFD) segment 108 is defined between each circumferentially spaced set of springs 78. A stop 100 is provided between SFD segments 108 to reduce or limit excursions of the PGB mounting assembly 4 with respect to the engine frame 48.

Referring to FIG. 3, oil 70 is fed into the damper land 68 which is bounded by the fitted end seals 64, 76 on either side of the damper land 68. The end seal clearance 74 controls the damping levels in the damper in combination with a feed orifice diameter 102 (FIG. 6) to the damper land 68. The vibration mode of the PGB module 4 will be excited by three different rotating elements: 1) LPT shaft 24 imbalance; 2) planet gear 52 imbalance; and 3) fan shaft 38 imbalance. Other engine loads can also be transmitted to the PGB such as oscillating aerodynamic loads from the fan, transient maneuver loads, and torsional excitations for the gear train. The integral damper will mitigate or reduce these vibrations and will also reduce or minimize the dynamic forces transmitted to the engine structure.

Referring to FIGS. 5 and 6, the integral damper formed from the outer and inner rims 88, 90 is segmented into segments 108. This allows for design of larger SFD land clearances 80 and makes the damper less prone to cavitation or aeration. This is advantageous because the diameters at which the damper will operate are large and the frequency of excitation is substantial, especially considering the LPT rotating speed. Diameter and speed determine the precession velocity of the damper and prior art dampers, for example those that include a squirrel cage bearing support using a 2 pi damper, will cavitate under high vibratory velocities. However, the segmented integral damper of the present technology will not cavitate under the same conditions due to the use of circumferential segments or barriers 108 which prohibit circumferential flow and direct all flow through the axial end seal clearances, 74. By diverting oil flow through the end seal clearances 74, one can solely rely on energy dissipation from the end seals and therefore can eliminate or reduce the unfavorable nonlinear effects that are indicative of small SFD clearances used in conventional 2 pi dampers. Hence this approach to energy dissipation yields a damper with linear behavior with large SFD clearances. Referring to FIG. 6, the integral damper segments 108 are created through, for example, EDM machining of the integral springs or flex elements 104, 106. The radial stiffness of the flex elements 104, 106 is in parallel to the radial stiffness of the flexible mount 60. The radial stiffness of the flex elements 104, 106 may be lower, even significantly lower, than the radial and torsional stiffness of the flexible support 60. One difference of the flexibly damped PGB 4 compared to bearing support dampers on main shaft bearings of the prior art is the application of torque. The application of torque on the torque cone 62 and the flexible mount 60 will create an angular deflection (in torsion) between the inner rim 90 of the flexible mount 60 and the engine frame 48. The integral flexible elements 104, 106 have to endure and sustain this deflection under loaded flight conditions. The deflections can be as large as, for example, about 20-30 mils (about 50-75 mm). The integration of the integral torsional flex elements 106 creates a low torsional stiffness in the integral spring assembly, which can sustain the 20-30 mil deflection under torqued conditions while possessing a reasonable stress level.

Figure 7:
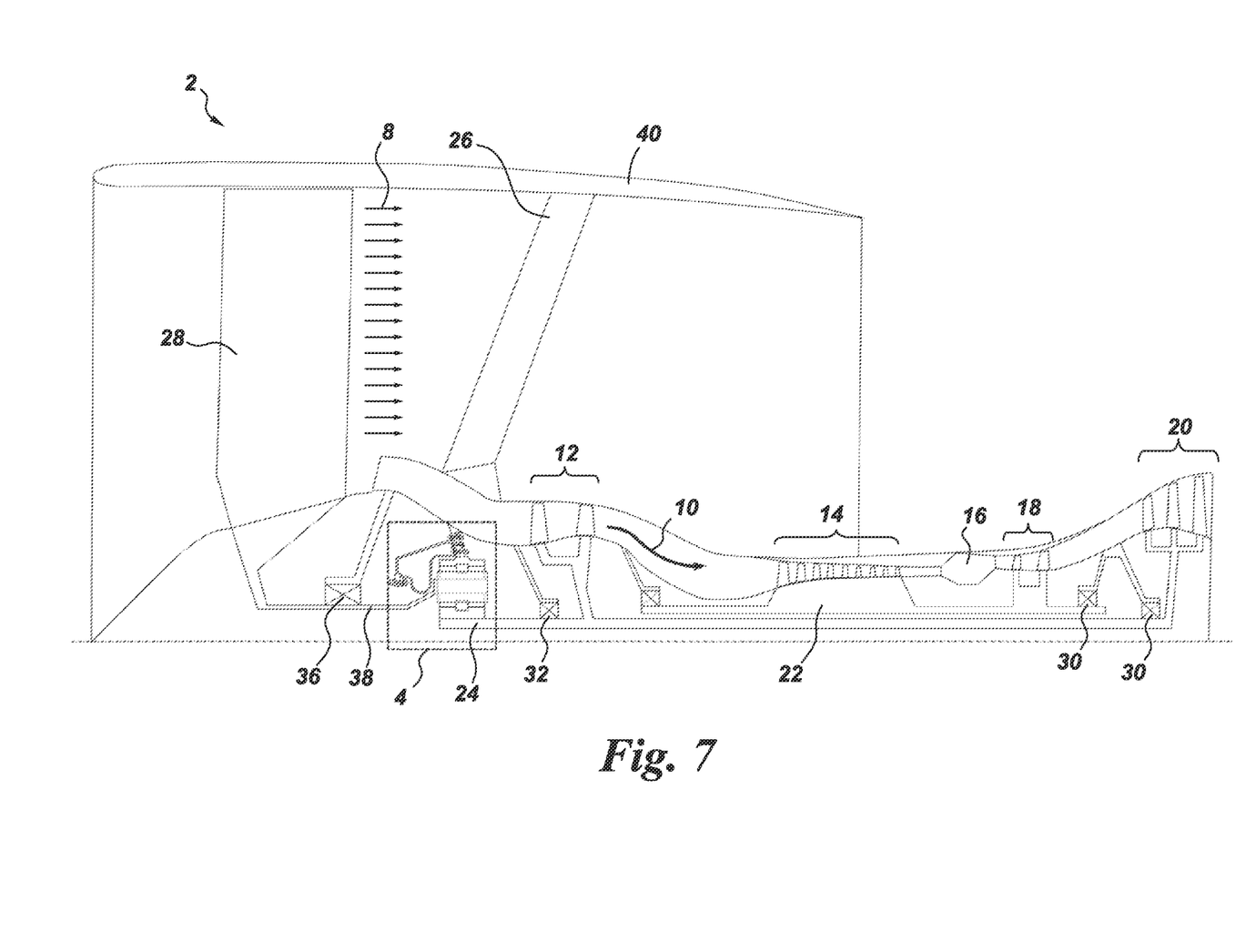
FIG. 7 schematically depicts a gas turbine engine for an aircraft including a flexibly damped power gear box (PGB) module according to another example of the present technology.
Figure 8:
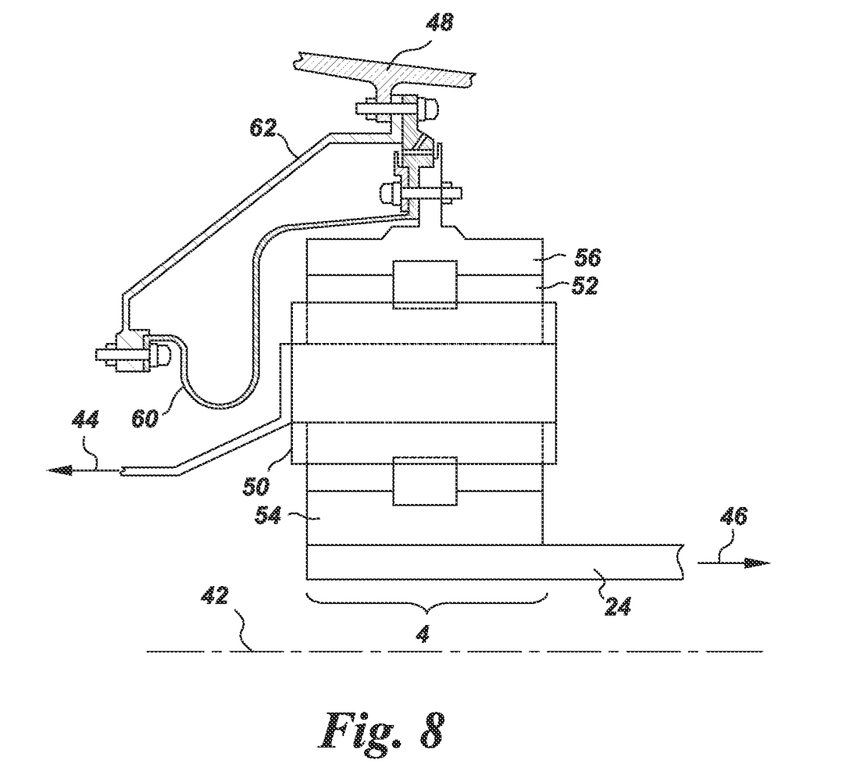
FIG. 8 schematically depicts the flexibly damped PGB module of FIG. 7.

Referring to FIGS. 7 and 8, in another example of the present technology, the PGB carrier 50 is connected to the fan shaft 38 as shown by arrow 44. The ring gear 56 is stationary in this configuration and the flexible mount 60 is connected to the ring gear 56.

Figure 9:
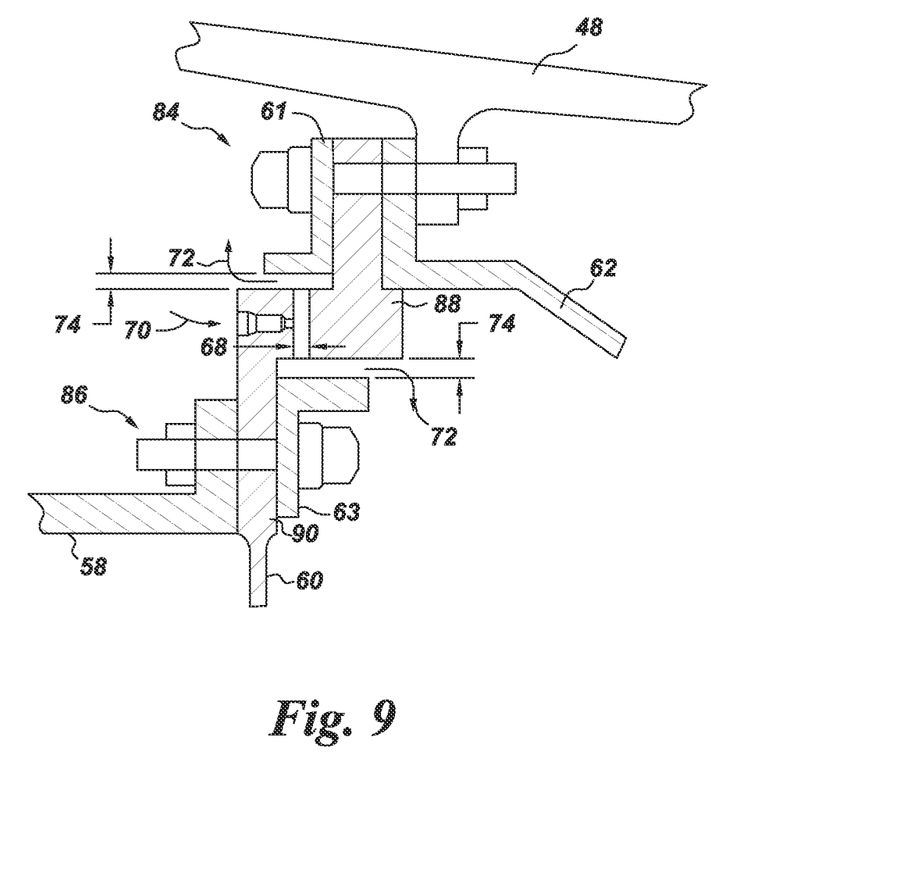
FIG. 9 schematically depicts an axial PGB damper according to another example of the present technology.

Referring to FIG. 9, an axial PGB damper contains similar elements as the lateral damper of FIG. 3 which are referenced with the same reference numbers except as noted. The SFD land 68 and an end seal 63 are rotated 90° in relation to the lateral damper of FIG. 3 to dampen vibrations in the axial direction (i.e. along the engine centerline 42). A second end seal 61 is provided at the connection 84 of the outer rim 88 of the flexible mount 60 and the torque cone 62 to the engine frame 48. Axial motion is coupled with the lateral motion and with torsional motion of the PGB module. This allows a choice of a direction for damping or even a combination of directions having an integral damper that contains different damping segments possessing a mix of lateral/torsional/axial dampers.

Figure 10:
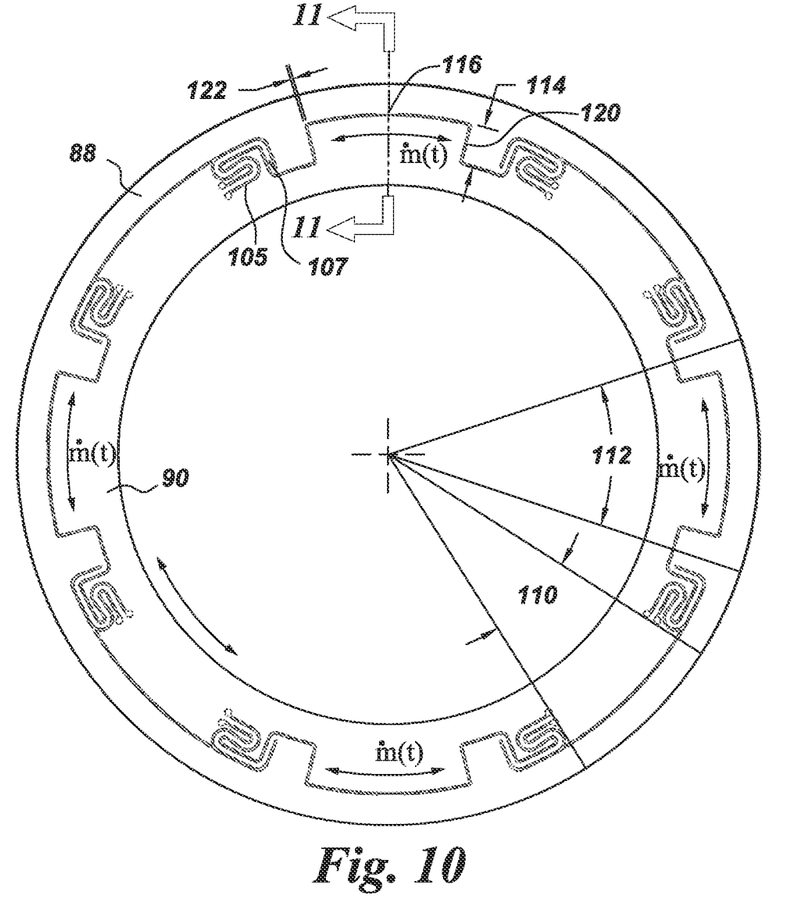
FIG. 10 schematically depicts an integral PGB carrier damper according to another example of the present technology.
Figure 11:
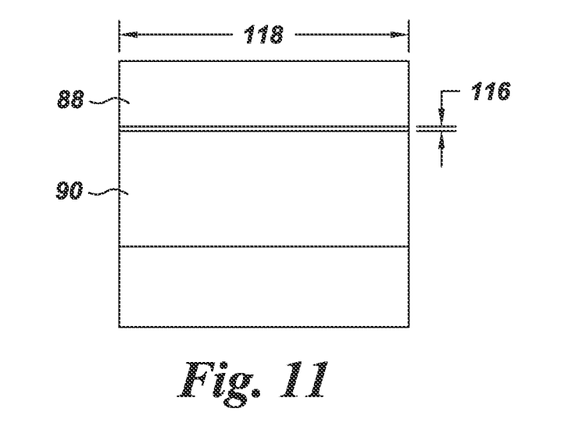
FIG. 11 schematically depicts a cross section of the damper of FIG. 10 along line 11-11.

Referring to FIGS. 10 and 11, an integral PGB damper includes torsional damper segments 112 dampen the torsional vibration modes of the PGB. The torsional damper segments 112 alternate with lateral damper segments 110. Torsional excitation T(t) can arise from gear mesh force transmissions or even torsional pulsations generated from the fan. Oil mass flow M(t) across the torsional damper restriction, or flow restriction gap 116 is a response to the oscillating dynamic torsional excitations T(t). In contrast to the damper of FIG. 5, tangential SFD lands 120, 122 having a height 114 provide a force that is in the direction of the torsional excitations T(t). Oil flows, as shown by M(t), between tangential SFD land 122 and tangential SFD land 120 through the restriction 116 providing energy dissipation. The damper includes radial/lateral flex elements 105 and torsional flex elements 107 similar to the damper of FIG. 5. The axial length 118 of the restriction 116 may be engineered to provide the appropriate dampening, and/or end seals can also be used to have varying end clearances, for example as in the damper of FIG. 5, depending on where the end seal is sealing against, either the radial/lateral damper segments 110 or the torsional damper segments 112.

It is to be understood that not necessarily all such objects or advantages described above may be achieved in accordance with any particular example. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While only certain features of the present technology have been illustrated and described herein, many modifications and changes will occur to those skilled in the art. It is, therefore, to be understood that the appended claims are intended to cover all such modifications and changes.

The invention claimed is:

1. An assembly for flexibly damping a power gear box for a gas turbine engine, the assembly comprising:
   a flexible mount connected to the power gear box at a first end of the flexible mount;
   a member connected to the flexible mount at the first end of the flexible mount and a second end of the flexible mount, wherein the first end of the flexible mount includes an outer rim connected to the member and an inner rim connected to the power gear box and a circumferentially segmented squeeze film damper land configured to receive a damping fluid is provided between the integral inner rim and the outer rim of the flexible mount.

2. The assembly of claim 1, further comprising:
   a first end seal connected to the power gear box and the inner rim of the flexible mount, wherein the power gear box includes a second end seal and the first end of the flexible mount is provided between the first and second end seals which provide end seal clearances for damping fluid from the squeeze film damper.

3. A gas turbine engine, comprising:
   a fan;
   a turbine connected to the fan through a power gear box; and
   the assembly of claim 2, wherein the squeeze film damper land is generally parallel to a centerline of the gas turbine engine.

4. The assembly of claim 1, further comprising:
   a first end seal connected to the power gear box and inner rim of the flexible mount; and
   a second end seal connected to the outer rim of the flexible mount and the member, wherein the first and second end seals provide end seal clearances for damping fluid from the squeeze film damper.

5. A gas turbine engine, comprising:
   a fan;
   a turbine connected to the fan through a power gear box; and
   the assembly of claim 4, wherein the squeeze film damper land is substantially perpendicular to a centerline of the gas turbine engine.

6. The assembly of claim 1, further comprising:
   a plurality of flexible elements provided in the flexible mount that absorb radial, lateral, and circumferential deflections of the inner rim of the flexible mount.

7. The assembly of claim 6, wherein the plurality of flexible elements are circumferentially spaced around the flexible mount and a plurality of squeeze film damper segments are provided between the plurality of flexible elements.

8. The assembly of claim 7, wherein each flexible element includes a first flexible element that absorbs radial deflections of the inner rim and a second flexible element that absorbs angular deflections of the inner rim about the rotation of the LPT and fan shaft center lines.

9. The assembly of claim 8, wherein the first flexible element and the second flexible element are integrally formed in the flexible mount.

10. The assembly of claim 9, further comprising a stop provided between each radial flexible element and torsional flexible element that limits movement of the assembly with respect to a stationary frame that the assembly is connected to.

11. The assembly of claim 7, wherein a total radial stiffness of the flexible elements is less than a radial stiffness of the flexible mount.

12. The assembly of claim 1, wherein the circumferentially segmented squeeze film damper land includes a plurality of tangential squeeze film damper lands spaced around the flexible mount and a flow restriction passage between adjacent tangential squeeze film damper lands.

13. The assembly of claim 1, wherein the flexible mount is connected to a carrier of the power gear box, the carrier housing a sun gear connected to a low pressure turbine shaft and a plurality of planet gears around the sun gear, the plurality of planet gears engaging a ring gear connected to a fan of the gas turbine engine.

14. A gas turbine engine, comprising:
   a fan;
   a turbine connected to the fan through a power gear box; and
   the assembly of claim 13, wherein the assembly flexibly damps vibrations of a turbine shaft connected to the power gear box and a fan shaft connected to the power gear box.

15. The gas turbine engine of claim 14, wherein the flexible mount and the member are connected to a frame of the gas turbine engine.

16. The assembly of claim 1, wherein the flexible mount is connected to a ring gear of the power gear box, the ring gear engaging a plurality of planet gears around a sun gear housed in a carrier and connected to a low pressure turbine shaft.

17. A gas turbine engine, comprising:
   a fan;
   a turbine connected to the fan through a power gear box; and
   the assembly of claim of claim 16, wherein the assembly flexibly damps vibrations of a turbine shaft connected to the power gear box and a fan shaft connected to the power gear box.

18. The gas turbine engine of claim 17, wherein the flexible mount and the member are connected to a frame of the gas turbine engine.

19. The assembly of claim 1, wherein the member has a conical portion.

* * * * *